United States Patent
Koman et al.

(10) Patent No.: US 12,299,428 B2
(45) Date of Patent: May 13, 2025

(54) INTEROPERABLE CONTAINERIZATION FOR FEATURE FRAMEWORK

(71) Applicant: Capital One Services, LLC, McLean, VA (US)

(72) Inventors: Swaroop Appu Koman, Scotch Plains, NJ (US); Thomas Barry, New York, NY (US); Walter Sze, Maspeth, NY (US); Tiange Huang, New York, NY (US); Paulo Frazao, Jersey City, NJ (US); Shreya Goddu, Long Island City, NY (US)

(73) Assignee: Capital One Services, LLC, McLean, VA (US)

( * ) Notice: Subject to any disclaimer, the term of this patent is extended or adjusted under 35 U.S.C. 154(b) by 119 days.

(21) Appl. No.: 18/182,309

(22) Filed: Mar. 10, 2023

(65) Prior Publication Data
US 2024/0303060 A1 Sep. 12, 2024

(51) Int. Cl.
*G06F 9/44* (2018.01)
*G06F 8/61* (2018.01)
*G06F 9/54* (2006.01)

(52) U.S. Cl.
CPC . *G06F 8/63* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 9,471,345 B2 * | 10/2016 | Jain | G06F 9/45525 |
| 11,403,154 B1 * | 8/2022 | Agarwal | G06F 9/5005 |
| 11,422,785 B2 * | 8/2022 | Manoharan | G06F 8/41 |
| 11,593,324 B2 * | 2/2023 | Dilts | G06F 16/26 |
| 2022/0357938 A1 * | 11/2022 | Lanford | G06F 8/63 |

* cited by examiner

*Primary Examiner* — Qamrun Nahar
(74) *Attorney, Agent, or Firm* — Foley & Lardner LLP (57) ABSTRACT

A method includes obtaining a container image associated with a target framework, a built distribution including a feature conversion class and a set of transform classes, and a configuration package. The method also includes executing the executables in a sequence indicated by the configuration package in a container based on the container image and generating an intermediate data structure by providing values of a source data framework to a feature conversion object constructed from the feature conversion class. The method also includes obtaining an identifier of a feature synthesis operation indicating the set of transform classes and, in response to obtaining the identifier of the feature synthesis operation, generating a transform output by providing a set of values of the intermediate data structure to a set of transform objects constructed from the set of transform classes.

20 Claims, 3 Drawing Sheets

INTEROPERABLE CONTAINERIZATION FOR FEATURE FRAMEWORK

SUMMARY

Real-world feature engineering on enterprise-scale datasets often requires communication between different types of programs, frameworks, or other tools to obtain or process data. Feature engineering may provide new insights about patterns in data, efficiencies in data storage, or other benefits. Despite these advantages, however, enterprise-scale feature engineering is often burdened with significant scaling issues that discourage the practical use of a large volume of data across different data processing frameworks in containerized environments. While some organizations may opt to force its stakeholders to use a unified framework or forgo computationally expensive feature engineering operations, such restrictions are detrimental to the long-term viability of data-driven operations. Moreover, continual ad hoc development to ensure compatibility between different data frameworks may quickly lead to an equally unmanageable number of issues as the number of possible applications or datasets evolve. Furthermore, such duplicated feature engineering operations may be sub-optimally coded with respect to each other, resulting in wasted computations or unnecessary hits to a database. Without a scalable solution, attempts to perform feature engineering operations may result in duplicated functionality across frameworks and sub-optimal performance.

To address one or more of the foregoing issues, some embodiments may create and use a set of interoperable containers that convert data and transform the converted data into a set of engineered features adapted for different data frameworks. Some embodiments may deploy containers that (i) connect to a framework currently used to store certain source data, (ii) use the source data to retrieve feature values, and (iii) provide these retrieved feature values to one or more application-specific tools of one or more target data processing frameworks to perform various types of operations, such as learning operations or analysis operations For example, in response to receiving a request indicating use of a target data processing framework, some embodiments may, retrieve a file set corresponding with the target data processing framework. The file set may include a container image of an environment to execute functionality of the target data processing framework, a built distribution of executables for building a feature conversion class and a set of transform classes for the target data processing framework in the environment of the container image, and a set of configuration instructions indicating an execution order of the built distribution. Some embodiments may use the container image to deploy a container and then execute, in a container environment of the container, executables of the built distribution based on the set of configuration instructions. Some embodiments may then generate an intermediate data structure by providing values of a source data framework to a feature conversion object constructed from the feature conversion class. Furthermore, some embodiments may receive an operation identifier indicating the set of transform classes and generate a transform output by providing a set of values of the intermediate data structure to a set of transform objects constructed from the set of transform classes. In this way, for example, the foregoing embodiments provides an adaptable and reusable method of building and deploying feature engineering tools, thereby enhancing the viability of feature engineering operations on enterprise-scale data.

Various other aspects, features, and advantages will be apparent through the detailed description of this disclosure and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Some embodiments may deploy containers that connect to an established framework used to store source data and use the source data to retrieve feature values. Some embodiments may then provide these retrieved feature values to one or more application-specific tools of a data processing framework to perform various types of operations, such as learning operations or analysis operations. In some embodiments, deploying a container may include retrieving a container image for the container, a set of executables, and a set of configuration instructions for the executables corresponding with a target framework in response to receiving a command that identifies the target framework. By providing an adaptable and reusable method of building and deploying feature engineering tools, some embodiments may enhance the viability of feature engineering operations on enterprise-scale data and free system resources from error-prone or inefficient ad hoc solutions.

Figure 1:
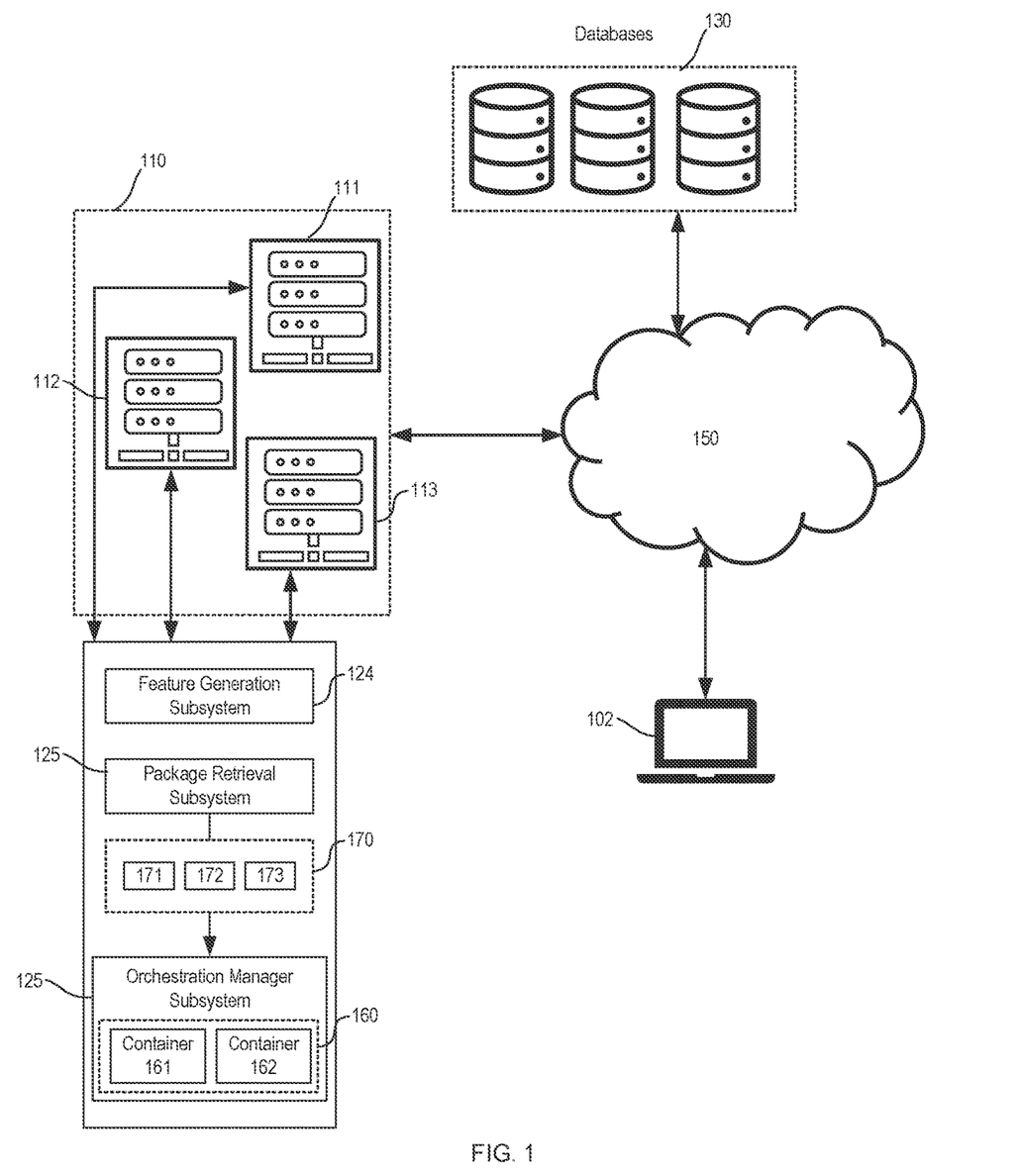
FIG. 1 shows an illustrative system for facilitating interoperability of a feature-using framework with a data system, in accordance with one or more embodiments.

FIG. 1 shows an illustrative system for facilitating interoperability of a feature-using framework with a data system, in accordance with one or more embodiments. A system 100 includes a client computing device 102. While shown as a mobile computing device, the client computing devices 102 may include other types of computing devices, such as a desktop computer, a wearable headset, a smartwatch, another type of mobile computing device, etc. In some embodiments, the client computing devices 102 may communicate with various other computing devices via a network 150, where the network 150 may include the Internet, a local area network, a peer-to-peer network, etc.

The client computing device 102 or other computing devices may send and receive messages through the network 150 to communicate with a set of servers 110 that may include a server 111, a server 112, and a server 113. The set of servers 110 may be used for various computing operations and may be used to orchestrate a set of containers, pods, clusters, etc. on the set of servers 110 or other servers (e.g., a set of cloud computing resources). For example, the set of servers 120 may include a non-transitory storage medium storing program instructions to perform one or more operations of subsystems 124-126. Further, while one or more operations are described herein as being performed by particular components of the system 100, those operations may be performed by other components of the system 100 in some embodiments. One or more operations described in this disclosure as being performed by the set of servers 120 may instead be performed by the client computing device 102 or other computing devices described in this disclosure. For example, the client computing device 102 may perform operations to initialize a containerized environment, retrieve container images, initialize a container, etc.

In some embodiments, the set of computer systems and subsystems illustrated in FIG. 1 may include one or more computing devices having electronic storage or otherwise be capable of accessing electronic storage, where the electronic storage may include the set of databases 130. The set of databases 130 may include data used to perform operations described in this disclosure, such as feature values of a source data framework, configuration files, container images, built distributions, container orchestration programs, other values used in this disclosure, etc.

In some embodiments, the feature generation subsystem 124 may retrieve data from source data and perform an initial set of transform operations on the source data to allow adaptability of the source data to generate features. For example, the feature generation subsystem 124 may retrieve a set of oracle-provided data, user-provided data, sensor-measured data, or other types of data and generate a set of features by applying one or more operations. Such operations may include elementary mathematical functions (e.g., adding two values, determining an exponent of a first value based on a second value, etc.). For example, some embodiments may receive a text response from a user and use the feature generation subsystem 124 to generate a vector representing features of the text response, where the vector may be a feature value or a plurality of feature values associated with an identifier of the user.

The feature generation subsystem 124 may update the set of databases 130 to include the generated feature values. In many cases, because unprocessed features may include sensitive information, noise, or important context, an enterprise-scale operation may wish to restrict users form accessing the unprocessed data. However, restricted users may still be permitted to perform analysis on feature values generated from the unprocessed data. Furthermore, by generating and storing feature values, some embodiments may prevent repetitive processing of data across different applications. For example, a first container 161 may execute a first application that performs a feature calculation based on a first feature value obtained from the databases 130, and a second container 162 may execute a second application that performs a feature calculation based on a second feature value obtained from the databases 130. By providing a global repository of function outputs, some embodiments reduce the computational costs that would have been incurred by separate feature computations necessary to obtain the first feature value. Such benefits may proportionally scale with the number of applications, users, and complexity of machine learning operations or data analysis operations.

In some embodiments, the package retrieval subsystem 125 may receive an identifier of a target framework and obtain a set of files 170. The target framework may be one of different data processing frameworks, and the set of files 170 may include a container image 171, a built distribution 172, and a set of configuration scripts 173. The built distribution 172 may be determined based on the container image or the target framework. For example, the package retrieval subsystem 125 may receive a command identifying "Framework01" as a target framework and, in response, obtain a built distribution that includes framework-specific classes to convert feature values from the databases 130 to values compatible with the framework "Framework01."

In some embodiments, the package retrieval subsystem 125 may retrieve the set of files 170 from the set of databases 130 and deliver the set of files 170 to an orchestration management subsystem 126. In some embodiments, the set of files 170 may be dynamically prepared based on both a specific target framework and an anticipated use for the target framework. For example, the package retrieval subsystem 125 may receive a command identifying "TensorFlow®" as a framework and, in response, select a container image identified as compatible with TensorFlow®. In some embodiments, a set of configuration instructions and a built distribution may be directly associated with the container image. For example, the package retrieval subsystem 125 may further determine a set of configuration instructions and a set of executables to be executed in a container initiated with the selected container image.

In some embodiments, the package retrieval subsystem 125 may use historic data indicating a user's previous container configuration parameters to determine a corresponding built distribution or set of configuration instructions for initializing a new container. For example, the package retrieval subsystem 125 may receive a command from a user to initialize a container for a target processing framework. In response, the package retrieval subsystem 125 may retrieve a profile of the user indicating the user's role. Some embodiments may then select a built distribution based on the role, where different roles may be assigned with different built distributions based on a role's respective requirements, priorities, or security limitations.

In some embodiments, the orchestration management subsystem 126 may initialize one or more containers based on the files 170. For example, the orchestration management subsystem 126 may deploy containers 160 based on data from the set of files 170, where the containers 160 may include a first container 161 and a second container 162. The orchestration management subsystem 126 may assign computing resources to the containers 160, initialize scripts or execute other operations based on configuration files, or otherwise manage operations of the containers 160.

In addition to initializing a container, the orchestration management subsystem 126 may perform various other types of container management operations. For example, the orchestration management subsystem 126 may schedule workloads, allocate additional computing resources for a container, deallocate computing resources as a result of container shutdown, etc. The orchestration manager may determine computing resources to a container by determining the allocation of computing resources to a pod that is shared between multiple containers. Alternatively, or additionally, the orchestration management subsystem 126 may manage multiple pods by updating parameters associated with a cluster of pods.

In some embodiments, the package retrieval subsystem 125 may obtain a set of container images that includes multiple container images, where an orchestration management subsystem 126 may then initialize different containers based on the multiple container images. For example, the package retrieval subsystem 125 may retrieve a set of files that includes a set of container images, which may include a first container image, a second container image, and a third container image. The orchestration management subsystem 126 may then initialize a first set of containers for a first pod based on the first container image, initialize a second set of containers for a second pod based on the second container image, and initialize a third set of containers for a third pod based on the third container image. Furthermore, while some embodiments may use different container images for different pods, some embodiments may use the same pod when initializing containers based on different container images.

In some embodiments, an application being executed by the set of containers 160 may perform operations to convert or transform a set of feature values using one or more executables of the built distribution 172. An executable of a built distribution compatible with a container image may include program code that may be executed by a container without additional compilation, if the container is initialized with the container image. An executable compatible within a container environment may be distinguished from other program code with respect to other compilation requirements. Unless otherwise indicated in this disclosure, using a class to perform an operation (e.g., conversion, transformation, etc.) may include generating an object based on the class and using the generated object to perform the operation. For example, a set of executables of the built distribution 172 may be stored on the first container 161. The first container 161 may then retrieve a feature value from the databases 130, generate a feature conversion object based on a feature conversion class of the built distribution 172, and use the feature conversion object to convert the retrieved feature value to a format compatible with a target framework.

Some embodiments may generate an intermediate data structure based on data retrieved from the databases 130. For example, the first container 161 may use a feature conversion class to instantiate a feature conversion object and then use the feature conversion object to generate a set of integer values from a set of texts and then store the set of integer values in an intermediate data structure. Some embodiments may generate an intermediate data structure that is stored differently from the source data. For example, the first container 161 may obtain a set of device identification numbers, a set of device geolocations associated with the device identification numbers, and a set of lost connection warnings associated with the set of device identification numbers. The first container 161 may convert the retrieved data into a set of framework-compatible data types and then generate an intermediate data structure that re-organizes the set of framework-compatible data types based on their associated geolocations. Furthermore, a conversion class may provide the capability to convert data from a first converted data type into a second converted data type. Some embodiments may generate a target intermediate data structure based on a previous intermediate data structure. For example, some embodiments may use a first set of feature conversion objects to generate a previous intermediate data structure and then use the previous intermediate data structure as inputs for a second set of feature conversion objects.

In some embodiments, the databases 130 may include both unconverted data as well as transformed data. For example, the databases 130 may include a plurality of initial data values and a set of data values generated using the feature generation subsystem 124. In some embodiments, the database 130 may receive a request for a subset of the initial data values. In some embodiments, the subset of the initial data values may be used to generate one or more data values of the set of data values generated using the feature generation subsystem 124 as intermediate transform operations. Some embodiments may provide the initial data values for validation operations or additional data experimentation operations.

In some embodiments, a data retrieval operation may first perform a check to determine if data had already been retrieved. In response to a determination that the data retrieval operation had already been performed, some embodiments may rely on a locally-stored value instead of requesting or pulling data from an external data source. For example, some embodiments may include an executable that may be used to retrieve a first set of feature values indicating embedding vectors of a text generated by the feature generation subsystem 124. The executable or an intermediary operation used by the executable may first determine whether the first container or another container sharing the same pod as the first container had already obtained the first set of values at a time that satisfies the time threshold. In response to a determination that the first container, or another container sharing the same pod as the first container, had already obtained the first set of values at a time that satisfies the time threshold, some embodiments may retrieve the previously retrieved value from a storage of the first container (e.g., a shared storage that is shared between containers of the pod).

As described elsewhere in this disclosure, the set of containers 160 may perform operations to transform a set of feature values. For example, the first container 161 may receive a command via a script to execute a feature synthesis operation to generate a feature that is not available from the databases 130. The first container 161 determines a set of transform objects to construct from a corresponding set of transform classes of the built distribution 172 based on an identifier of the feature synthesis operation. The first container 161 may then provide a converted feature value to the constructed set of transform objects to obtain a transformation output of the set of transform objects. A transform object may include a combined transform object, where a combined transform object may represent the execution of an execution order of transform objects in a specified order to obtain a transform output. Some embodiments may generate a set of intermediate outputs using a first set of transform objects and then use the set of intermediate outputs as inputs for other transform objects to obtain a final transform output. For example, some embodiments may construct a combined transform object as a combination of a first transform object that outputs a sum of a first feature value to a second feature value and a second transform object that outputs the product of the sum and a value obtained from an oracle Application Program Interface (API).

In some embodiments, different containers of the set of containers may be used for different frameworks. For example, some embodiments may retrieve the set of files 170 based on a first target framework and deploy the first container 161 based on the set of files 170. Some embodiments may then retrieve a different set of packages based on a different target framework and deploy the second container 162 based on the different set of packages. The first container 161 may perform a first set of conversion operations and transform operations based on a set of feature values of the databases 130, and the second container 162 may perform a second set of conversion operations and transform operations based on the same set of feature values.

Some embodiments may receive information from the containers 160 indicating repeated transformation of retrieved feature values into the same or similar transform outputs. For example, the first container 161 may convert a first and second feature value to first and second converted feature values, respectively, where the first and second converted feature values may be compatible for transform operations of a first data processing framework. The first container 161 may then perform a first transform operation that outputs a product of the first and second converted feature values. The second container 162 may convert the first and second feature values to third and fourth converted feature values, respectively, where the third and fourth converted feature values may be compatible with transform operations a second data processing framework that is different from the first data processing framework.

Figure 2:
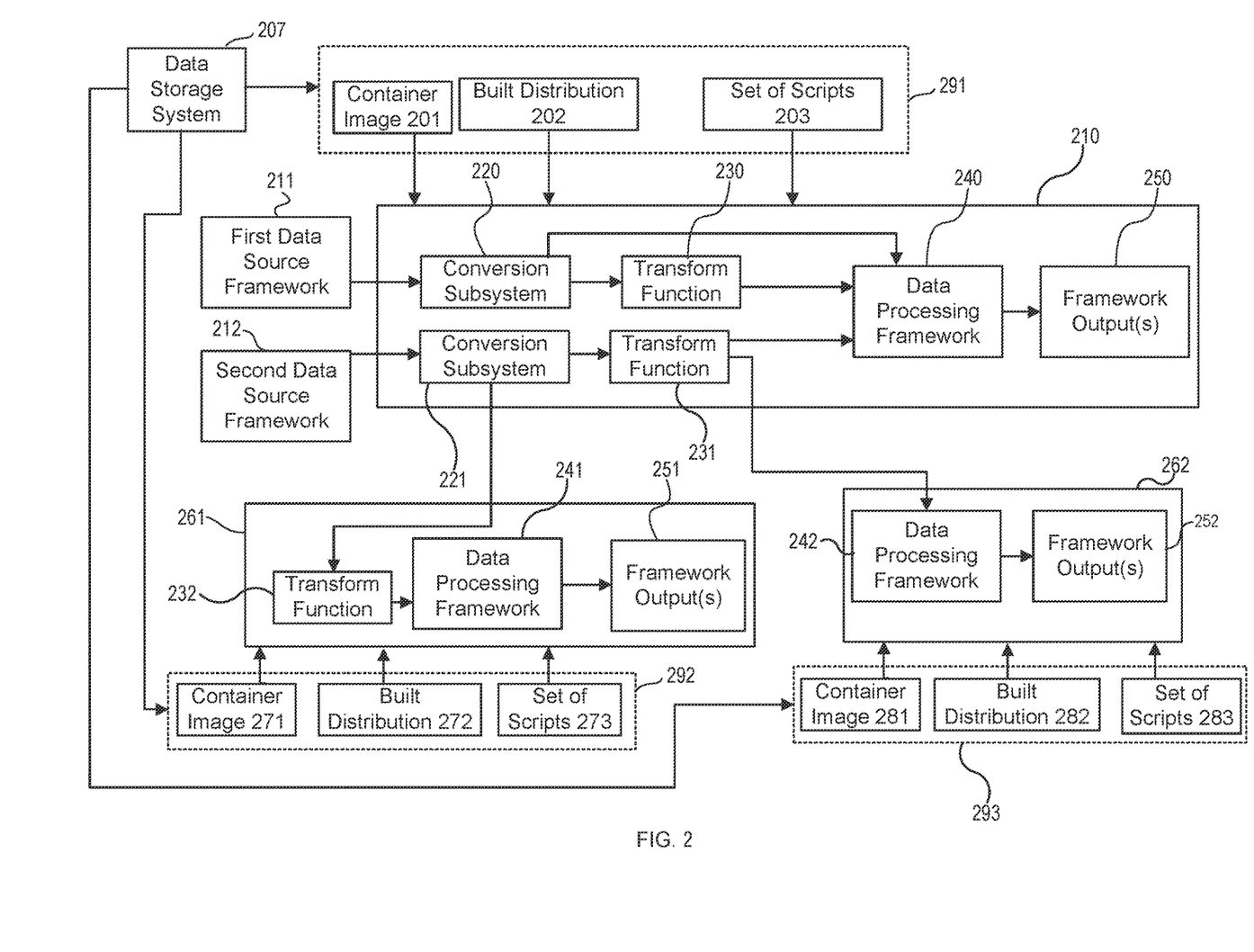
FIG. 2 shows an illustrative diagram of a data processing architecture, in accordance with one or more embodiments.

FIG. 2 shows an illustrative diagram of a data processing architecture, in accordance with one or more embodiments. In some embodiments, a first container 210 may be initialized based on a container image 201. The first container 210 may then execute one or more executables of the built distribution 202 based on the set of configuration instructions 203. The container image 201, built distribution 202, and the set of configuration instructions 203 may be collectively referred to as a first file set 291. Similarly, a second file set 292 may include a second container image 271, a second built distribution 272, and a set of configuration instructions 273. Similarly, a third file set 293 may include a third container image 281, a third built distribution 282, and a third set of configuration instructions 283. Furthermore, a data storage system 207 may include the first file set 291, the second file set 292, and the set 293. For example, some embodiments may initialize a set of background activities in an order directed by the set of configuration instructions 203 container, where the background activities include executing a first executable of the built distribution 202.

The set of executables of the built distribution 202 may include a set of executables of a conversion subsystem 220, which may obtain data from a first data source framework 211. Furthermore, some embodiments may obtain data from different types of data source frameworks and include one or more conversion applications, modules, functions, etc. to convert data from multiple data sources. For example, the set of executables of the built distribution 202 may include a set of a second conversion subsystem 221 to obtain data from a second data source framework 212, where the formats of the values of the first data source framework 211 and the second data source framework 212 may differ (e.g., the value for an account identifier in the first data source framework 211 may be a string and the value for the corresponding account identifier in the second data source framework 212). It should be understood that some embodiments may communicate with multiple additional data source frameworks.

The first container 210 may perform a first set of transform operations using a first transform function 230. The first transform function 230 may be a function implemented by an executable of the built distribution 202, where the executable may represent a transform class. Similarly, the first container 210 may perform a second set of transform operations using a transform function 231 that is implemented by an executable representing another transform class. The outputs of the first transform function 230 and the transform function 231 may be provided to the first data processing framework 240 to obtain a first set of framework outputs 250. The first data processing framework 240 may be implemented with a set of applications native to the corresponding container environment and may be used to generate machine learning model, train a machine learning model, use a trained machine learning model to provide a prediction, or perform other operations described in this disclosure. The set of framework outputs 250 may include one or more various types of framework outputs, such as a set of machine learning parameters (e.g., weights, biases, memory values, etc.), learning model predictions, statistical results, simulation results, etc.

Some embodiments may further initialize or otherwise manage multiple containers, such as a second container 261 and a third container 262, where different containers may be provided a copy of the same container image used to initialize the first container 210 or may be provided with a different container image, built distribution of executables, or a set of configuration instructions. For example, the second container 261 may have been initialized with the second container image 271, the second built distribution 272, and a second set of configuration instructions 273. Similarly, some embodiments may initialize the third container 262 with the third container image 281, the third built distribution 282, and the third set of configuration instructions 283. The second container 261 may execute a transform function 232 based on an output of the second conversion subsystem 221, where the second conversion subsystem 221 may be executed by the first container 210. Some embodiments may then provide an output of the transform function 232 to the data processing framework 241 to obtain a second set of framework outputs 251, where the data processing framework 241 may be implemented by a second set of applications native to the second container 261 and sent as executables of the second built distribution 272. Similarly, the third container 262 may execute a third set of applications implementing a third data processing framework 242 based on a transform output of the transform function 231 executed by the first container 210 to generate the set of framework outputs 252. In some embodiments, the sets of applications used to implement the data processing framework 241 and third data processing framework 242 may be native to the operations systems of the second container 261 and the third container 262, respectively.

While some data processing operations may use transform functions operated by a shared container, other data processing operations may obtain converted values, transform outputs, or other values from different containers and use the obtained values to determine a data processing framework output. Furthermore, some embodiments may deploy containers that do not share a pod or otherwise do not directly share computing resources, such as memory resources, processor resources, etc. Furthermore, some embodiments may send files from one container to another. For example, some embodiments may send a built distribution from a first container of a first pod to a second container of a second pod. Alternatively, or additionally, some embodiments may send the built distribution from the first container of the first pod to another container of the same first pod.

Figure 3:
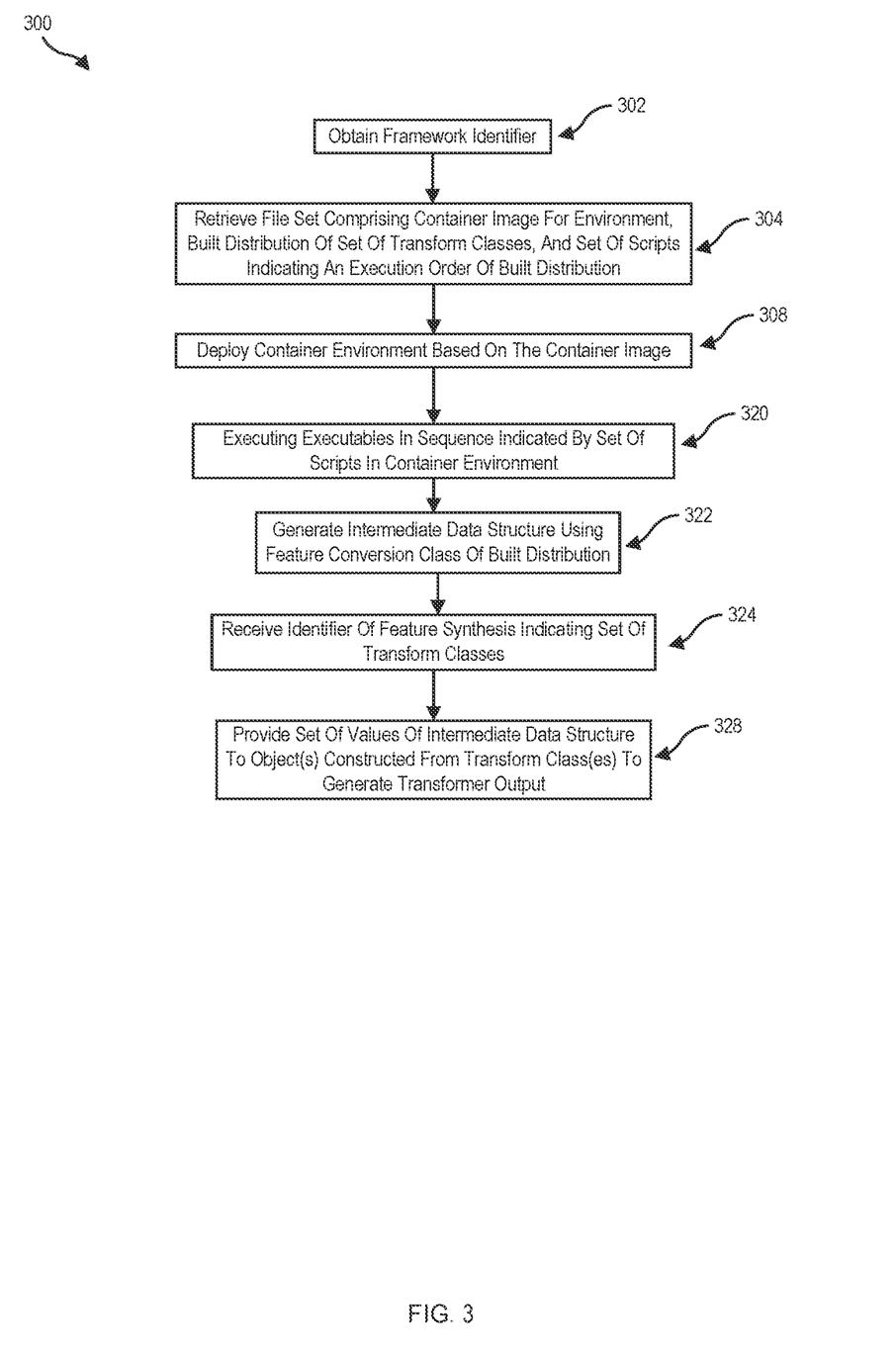
FIG. 3 shows a flowchart of a process to facilitate interoperability between a data system and a target data processing framework, in accordance with one or more embodiments.

FIG. 3 shows a flowchart of a process to facilitate interoperability between a data system and a target data processing framework, in accordance with one or more embodiments.

Some embodiments may obtain a framework identifier of a target data processing framework, as indicated by block 302. Some embodiments may receive the framework identifier via a command of a script or terminal input. For example, an infrastructure developer may initiate a script that includes a framework identifier for a framework, such as TensorFlow®, Keras®, Pytorch®, etc. In some embodiments, the framework identifier may be a name of the framework or may be another character sequence or set of symbols to represent the framework.

Some embodiments may retrieve a file set that includes a container image for an environment of the target data processing framework, a built distribution of a set of executables, and a set of configuration instructions indicating an execution order for the built distribution, as indicated by block 304. Some embodiments may retrieve a file set that includes different types of files to perform different functions that enable interoperability between a target data processing framework and a data storage system. In some embodiments, the file set may include a container image of an environment to execute the functionality for the target data processing framework. As used in this disclosure, a container image may include executable code for generating a container on a computing system. The container image may be compatible with a container engine and may vary based on the target data processing framework identifier provided by a user or script.

In some embodiments, retrieving the file set may include retrieving a built distribution of a set of executables, where the set of executables may include executables for a set of feature conversion classes or a set of transform classes for a target data processing framework in the environment. Some embodiments may use the set of feature conversion classes to convert feature outputs of a source data framework into a format that is compatible with a target data processing framework. For example, some embodiments may convert a floating point output of a source data framework into an integer value compatible with a target data processing framework. Various other types of conversion operations may be performed, where a non-limiting set of example conversions may include converting a numeric type of data into a text data type, converting a list of values into a tubal, converting a numeric data type into a binary data type, etc.

In some embodiments, the built distribution may include executables for a set of transform classes. As described elsewhere in this disclosure, some embodiments may perform additional transform operations using the set of transform classes by combining one or more feature values to generate an additional output used for one or more data processing operations. For example, some embodiments may provide an object generated based on a transform class with a first feature value representing a number of record updates over a duration and a second feature value representing a number of fields that were updated to obtain an average number of fields changed per record update.

In some embodiments, retrieving the file set may include retrieving a set of configuration instructions to indicate an order of execution. For example, some embodiments may retrieve a set of configuration instructions based on a target framework, where the set of configuration instructions may be directly associated with a container image and a set of executables. The set of configuration instructions may include a configuration file that initializes a container or may be executed by the container to initialize the set of executables. For example, a user such as an application developer or infrastructure developer may provide a computer system with a command indicating a target framework. The command may cause the computer system to access a database based on an identifier of the target framework and retrieve a configuration file associated with the identifier. The command may then cause the computer system to initialize a container based on a container image and execute the set of executables based on the configuration file.

Some embodiments may deploy a container environment based on the container image, as indicated by block 308. Deploying a container environment may include performing various types of operations that enable a container for use to connect with a target framework. Some embodiments may perform operations such as determining computing resources for a container, where determining a computing resource for a container may include determining memory resources, processor resources, or other resources for the container. As described elsewhere in this disclosure, some embodiments may configure a container to be a part of a pre-existing pod or a pre-existing node of a cluster. Alternatively, some embodiments may initialize a new pod or a new cluster based on a configuration file or other instructions associated with a target framework.

Some embodiments may execute the executables of the built distribution in an execution order indicated by the set of configuration instructions in the container environment, as indicated by block 320. In some embodiments, the executables of the built distribution to be executed based on the set of configuration instructions may include various transformation classes or conversion classes. In some embodiments, executables associated with a transformation class or conversion class may be executed to generate a specific set of objects that may then be used for a transformation or conversion operation. By executing a set of executables in an execution order determined by the set of configuration instructions, some embodiments may reduce the risk of misconfiguration, improper dependency structures, etc. Furthermore, some or all of the set of configuration instructions may indicate an execution order to be used during a later use of one or more executables of the built distribution. For example, some embodiments may execute a sequence of executables of the built distribution in an execution order defined by the set of configuration instructions after receiving instructions to execute the sequence of executables.

Some embodiments may use geographical location information or other types of location information to determine one or more properties of container setup. For example, some embodiments may determine a geographical location of a user wish to perform a set of computations. Some embodiments may then determine a set of computing resources (e.g., available memory resources, available processor resources, etc.) based on the geographical location or other type of location information. For example, some embodiments may determine that a user is requesting machine learning operations from a first geographical location. In response, some embodiments may select a set of memory and processor resources that are within a 100-mile physical proximity of the first geographical location.

Some embodiments may generate an intermediate data structure using a feature conversion class of the built distribution, as indicated by block 322. As described elsewhere in this disclosure, a container may retrieve values from a source data framework and convert the values into a form compatible with a different framework. For example, some embodiments may obtain a source value that is a numeric value for a first field and convert the numeric values into text values that are compatible with a first data processing framework. Alternatively, or additionally, some embodiments may obtain text values for a second field and convert the text values into numeric values for the field as it is used in a second data processing framework. Furthermore, some embodiments may convert a first numeric value into a different type of numeric value, such as converting a floating point numeric value into an integer value, converting a character into a string, etc.

As described elsewhere in this disclosure, the converted values generated from source values may then be used for transform operations or directly used for other data processing operations of a target data framework. Furthermore, some embodiments may store the converted values in a data structure that is different from the data structure used to store the retrieved values of a source data framework. For example, some embodiments may retrieve data stored in a relational database structure and store the converted values in a non-relational database structure, such as a key-value data store structure, graph database structure, etc. By storing the converted data into an intermediate data structure that is then used to provide values to a set of transform functions implemented with the use of a corresponding set of transform classes, some embodiments may increase the efficiency of the set of transform functions by adapting an intermediate data structure into a more efficient form of use.

Some embodiments may determine whether the retrieved features used to generate an intermediate data structure, or other features retrieved from a data source, match a historic set of features. As used in this disclosure, a set of features used to generate an intermediate data structure may include a set of features used to generate converted values that are then used to generate the intermediate data structure. Some embodiments may determine whether a retrieved set of features matches a historic set of features by recording the features or records requested from a data source by a container or set of containers and comparing the recorded features with a historic set of features stored in a database. Alternatively, some embodiments may actively send, from a container or computing device, identifiers of a set of features used to generate an intermediate data store for comparison with a historic set of features.

In response to a determination that a historic set of features matches features of a generated data structure, some embodiments may perform operations to provide additional recommendations for data retrieval. For example, some embodiments may determine whether a first set of features of an intermediate data structure stored on a container includes feature values from the features "feature01," "feature02," and "featureXYZ," and that this first set of features matches a historic set of features that also includes "feature01," "feature02," and "featureXYZ." In response to a determination that the first set of features matches the historic set of features, some embodiments may send an identifier of an additional feature that is associated with the historic set of features. For example, if the feature "featureABC" is an additional feature associated with the historic set of features, some embodiments may send an identifier of the feature "featureABC" to the container or to a user associated with the container.

Some embodiments may perform operations to detect that a conversion operation is being performed multiple times for different applications and, in response, update a data source to include the converted feature value. For example, some embodiments may obtain a first data type of a converted value converted from a first value of a first source data framework stored on a first container and obtain a second data type of a converted value converted from a second value of a second source data framework stored on a second container. Some embodiments may then determine that the first and second data types match each other and may further count a number of matches from other containers. In response to a number of matches of a data type of converted values of a source data value satisfying a threshold, some embodiments may generate a new feature conversion operator to convert the source data value to the data type of the converted values. Some embodiments may then generate a new set of feature values using the feature conversion operator to update a data source. By using the newly generated values of the feature conversion operator, some embodiments may reduce duplicative computations for conversion operations.

Some embodiments may include an identifier of a set of transformed classes implemented by one or more of the executables of the built distribution, as indicated by block 324. Some embodiments may receive instructions to perform a set of transform operations and, based on identifiers of the instructions, execute a set of executables of the built distribution corresponding with the identifiers. For example, some embodiments may receive a script that includes instructions to execute "transform01" based on converted values "feature01," where executing the transform function "transform01" may cause a container to determine a sum based on a value of "feature01" and a randomly generated value. In response, some embodiments may execute "transform01" for each value of the set of feature values "feature01" to generate a set of transform outputs.

Some embodiments may include explicit transform function identifiers, while some functions may include other types of operation identifiers. For example, some embodiments may receive an operation identifier "train" in the instruction message "train ML01 dataset01." In response, some embodiments may perform a set of operations that includes converting data from "dataset01" into a set of converted values and providing the converted values to a transform function to generate a set of transform outputs. Some embodiments may then provide the transform outputs to a machine learning model to generate a trained machine learning model.

As described elsewhere, a container may use a set of transformer functions that outputs results used by different data processing frameworks. For example, some embodiments may use a first data processing framework operating in the environment of a first container and send outputs of a first transform function to a first data processing framework. Some embodiments may further send the same output or different outputs of the first transform function to an additional framework. For example, some embodiments may use a transform function that outputs a value "5.2" and sends the value "5.2" to a Pytorch® data processing framework and further sends the value "5.2" to a TensorFlow® data processing framework.

Some embodiments may provide a set of values of the intermediate data structure to a set of objects constructed from the set of transformed classes to generate a transform output, as indicated by block 328. Some embodiments may perform feature synthesis operations to generate additional feature values that are then used for various types of operations, such as machine learning operations, statistical analysis operations, optimization operations, etc. For example, some embodiments may use a transform function to perform a set of arithmetic and statistical operations based on a set of converted values that were converted from a data source framework, where the output of the transform function is not available from the source data framework. Additionally, some embodiments may perform transform functions in a specified sequence to generate combined transform outputs, where an output of a first transform function may be provided as input to a second transform function.

Some embodiments may send an indication of the use of transform function. For example, some embodiments may send a set of executables that is used to implement a transform function, where the set of executables may include a set of transform classes. The set of transform classes or other program code of the set of executables may include program code to send back a set of identifiers of the set of transform classes used to generate a transform output to a server or other computing device. Some embodiments may receive multiple indications from multiple containers, pods, or clusters, where the multiple indications may correspond to sets of transform operations used to determine transform outputs. In some embodiments, the indications may include transform outputs. For example, after using a first set of executables to a determine a first transform output, some embodiments may send the transform output to a server. Similarly, after using a second set of executables to determine a second transform output, some embodiments may send the second transform output to the server. The server may then determine, based on the use of the first and second set of transform outputs or a match between the first and second transform outputs, that the information sent back to the server indicates a repeated transform operation.

Some embodiments may count the number of times that a shared set of identifiers of a set of transform classes used to determine transform outputs are provided from one or more containers. In response to a determination that a count of the number of times that a set of transform classes are used for a threshold number of times by one or more containers, some embodiments may propose or generate a new transform class based on a sequence determined from the set of identifiers. Furthermore, some embodiments may verify that the new transform class based on whether a transform output of the new transform class matches transform outputs sent by a container or other computing device and treat the new transform class as an additional feature generation class. By generating an additional feature generation class, some embodiments may use the feature generation class to generate additional feature values and reduce the number of duplicative computations being performed.

Some embodiments may send messages indicating the availability of the feature generation class to a set of users. For example, a user associated with a container that uses a set of transform classes to determine a transform output may be alerted that a set of feature values may be used to replace the outputs of the set of transform classes, where the set of feature values are generated using a feature generation class. Alternatively, or additionally, some embodiments may send feature values generated with the newly generated feature generation class to one or more containers. For example, after receiving identifiers from a plurality of containers indicating the retrieval of a set of features from a data source, some embodiments may generate a new feature generation class based on the set of features, generate a new set of feature values using the new feature generation class, and send the new set of feature values to the plurality of containers.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a non-transitory, machine-readable medium, such as an electronic storage medium. Furthermore, the use of the term "media" may include a single medium or combination of multiple media, such as a first medium and a second medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database, such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combinations of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 124-126 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 124-126 described herein is for illustrative purposes, and is not intended to be limiting, as any of subsystems 124-126 may provide more or less functionality than is described. For example, one or more of subsystems 124-126 may be eliminated, and some or all of its functionality may be provided by other ones of subsystems 124-126. As another example, additional subsystems may be programmed to perform some or all of the functionality attributed herein to one of subsystems 124-126.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen and/or a dedicated input device, such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompasses both all such attributes or functions being mapped to all such objects and subsets of the attributes or functions being mapped to subsets of the attributes or functions (e.g., both/ all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of already-generated value.

Enumerated Embodiments

The present techniques will be better understood with reference to the following enumerated embodiments:
1. A method comprising: retrieving a file set for executing applications of a target data processing framework, wherein the file set comprises (i) a container image of an environment to execute functionality of the target data processing framework, (ii) a built distribution of executables for building a feature conversion class and a set of transform classes for the target data processing framework in the environment of the container image, and (iii) a set of configuration instructions indicating an execution order of the built distribution; deploying a container based on the container image; executing, in a container environment of the container, the executables in an execution order indicated by the set of configuration instructions; generating an intermediate data structure by providing values of a source data framework to a feature conversion object constructed from the feature conversion class; receiving an identifier of a feature synthesis operation indicating the set of transform classes; and generating a transform output by providing a set of values of the intermediate data structure to a set of transform objects constructed from the set of transform classes.
2. A method comprising: obtaining a container image associated with a target framework, a built distribution comprising program code for a feature conversion class and a set of transform classes, and a set of configuration instructions; executing the executables in an execution order indicated by the set of configuration instructions in a container that is deployed based on the container image; generating an intermediate data structure by providing values of a source data framework to a feature conversion object constructed from the feature conversion class; obtaining an identifier of a feature synthesis operation indicating the set of transform classes; and in response to obtaining the identifier of the feature synthesis operation, generating a transform output by providing a set of values of the intermediate data structure to a set of transform objects constructed from the set of transform classes.
3. A method comprising: obtaining a set of container images associated with a target framework, a built distribution comprising program code for a feature conversion class and a set of transform classes, and a set of configuration instructions; executing a set of executables of the built distribution in an execution order indicated by the set of configuration instructions in a container that is deployed based on the set of container images; generating a converted value based on a source value of a source data framework using the feature conversion class; obtaining an operation identifier; and in response to obtaining the operation identifier, generating an output based on the converted value using the set of transform classes.
4. The method of any of embodiments 1 to 3, wherein the set of transform objects comprises a combined transform object, and wherein providing the set of values of the intermediate data structure to the combined transform object comprises: obtaining an intermediate output by executing a first transform object based on the set of values; and obtaining the transform output by executing a second transform object based on the intermediate output.
5. The method of any of embodiments 1 to 4, wherein: the values of the source data framework comprise first values; the feature conversion object is a first feature conversion object; the intermediate data structure is a target intermediate data structure; and generating the target intermediate data structure comprises: generating a previous intermediate data structure using a second feature conversion class by providing second values of the source data framework to a second feature conversion object constructed from the second feature conversion class; and generating the target intermediate data structure using the first feature conversion object by providing one or more values of the previous intermediate data structure to the first feature conversion object.
6. The method of any of embodiments 1 to 5, wherein: the set of transform classes is a first set of transform classes; the transform output is a first transform output; the program code of the built distribution comprises program code for a second set of transform classes associated with an additional framework; the feature synthesis operation is a first feature synthesis operation; the set of transform objects is a first set of transform objects; and the method further comprising: determining a first framework output of the target framework by providing, as an input, the first transform output to a first set of applications, wherein the first set of applications is native with respect to the target framework; obtaining an identifier of a second feature synthesis operation indicating the second set of transform classes; and in response to obtaining the identifier of the second feature synthesis operation, generating a second transform output by providing the set of values to a second set of transform objects constructed from the second set of transform classes; and determining a second framework output of the additional framework by providing, as an input, the second transform output to a second set of applications, wherein the second set of applications is native with respect to the additional framework.
7. The method of any of embodiments 1 to 6, wherein the container is a first container, the method further comprising:

deploying the first container, wherein the first container comprises a first executable of the feature conversion class, and wherein generating the intermediate data structure comprises using the first container; and deploying a second container, wherein the second container comprises a second executable of the set of transform classes, and wherein generating the transform output comprises using the second container.

8. The method of any of embodiments 1 to 7, wherein the set of transform classes is a first set of transform classes, and wherein the container is a first container, the transform output is a first transform output, the method further comprising: obtaining a second set of container images associated with a second target framework, a second built distribution comprising program code for a second set of transform classes; deploying a second container based on the second set of container images; generating, using the second container, second intermediate data by providing the values to a second feature conversion object; generating a second transform output by providing the set of values of the intermediate data structure to a second set of transform objects constructed from the second set of transform classes; and determining an indication of a repeated transform operation based on the first transform output and the second transform output.

9. The method of embodiment 8, further comprising: retrieving a first set of identifiers of the first set of transform classes; and determining a feature generation class based on the first set of transform classes.

10. The method of any of embodiments 1 to 9, further comprising: determining whether features of the intermediate data structure is shared with a historic set of features; identifying an additional feature associated with the historic set of features; and sending an identifier of the additional feature to a user associated with the container.

11. The method of any of embodiments 1 to 10, wherein the feature conversion class converts a text value into a numeric value.

12. The method of any of embodiments 1 to 11, wherein the feature conversion class converts a numeric value into a text value.

13. The method of any of embodiments 1 to 12, wherein the container is a first container, and wherein the output is a first output, the method further comprising sending the converted value to a second container, wherein the second container uses the converted value to determine a second output that is different from the first output.

14. The method of any of embodiments 1 to 13, wherein: the converted value is a first converted value; the source value is a first source value; the method further comprise generating a second converted value based on a second source value of the source data framework; and generating the output comprises using the set of transform classes to generate the output based on the second converted value and the converted value.

15. The method of any of embodiments 1 to 14, wherein the container is a first container, the method further comprising: receiving, from a first user, a first command indicating the target framework, wherein obtaining the set of container images comprises obtaining the set of container images in response to receiving the first command; receiving, from a second user, a second command indicating the target framework; deploying a second container, wherein the second container and the first container do not share a pod; and sending, from the first container to the second container, the built distribution.

16. The method of any of embodiments 1 to 15, the method further comprising: determining a geographical location associated with a message indicating the target framework; selecting a set of computing resources based on the geographical location; and deploying the container using the set of computing resources.

17. The method of any of embodiments 1 to 16, wherein the container is a first container, the method further comprising: deploying a plurality of containers, wherein the plurality of containers comprises the first container; obtaining identifiers of transform classes from the plurality of containers; obtaining a plurality of transform outputs from the plurality of containers; and selecting a feature value of the source data framework based on the plurality of transform outputs and the identifiers of the transform classes, wherein each value of the plurality of transform outputs satisfies a threshold based on the feature value; and sending the feature value to the plurality of containers.

18. The method of any of embodiments 1 to 17, wherein the container is a first container, and wherein the converted value is a first converted value, the method further comprising: deploying a plurality of containers, wherein the plurality of containers comprises the first container; obtaining a plurality of converted values, wherein the plurality of converted values comprises the first converted value; in response to a determination that the plurality of converted values share a same value, determining a feature conversion operator, wherein the feature conversion operator outputs the same value when provided with the source value; and updating a source database using the feature conversion operator.

19. The method of any of embodiments 1 to 18, the method further comprising: obtaining a plurality of initial data values; generating a plurality of feature values based on the plurality of initial data values by performing a set of intermediate transform operations; and storing the plurality of feature values in the source data framework, wherein the plurality of feature values comprises the source value.

20. The method of embodiment 19, wherein the source value is associated with a set of data values of the plurality of initial data values, the method further comprising: receiving, from the container, a message comprising an identifier of the set of data values; and sending the source value in response to receiving the message.

21. One or more tangible, non-transitory, machine-readable media storing instructions that, when executed by a set of processors, cause the set of processors to effectuate operations comprising those of any of embodiments 1-20.

22. A system comprising: a set of processors; and memory storing computer program instructions that, when executed by the set of processors, cause the set of processors to effectuate operations comprising those of any of embodiments 1-20.

What is claimed is:

1. A system for executing feature engineering operations between different data processing frameworks using framework-specific classes, the system comprising a computer system that comprises one or more processors programmed with computer program instructions that, when executed, cause the computer system to perform operations comprising:

retrieving a file set for executing applications of a target data processing framework, wherein the file set comprises (i) a container image of an environment to execute functionality of the target data processing framework, (ii) a built distribution of executables for building a feature conversion class and a set of transform classes for the target data processing framework in the environment of the container image, and (iii) a set of configuration instructions indicating an execution order of the built distribution;

deploying a container based on the container image;

executing, in a container environment of the container, the executables in the execution order indicated by the set of configuration instructions;

generating an intermediate data structure by providing values of a source data framework to a feature conversion object constructed from the feature conversion class;

receiving an identifier of a feature synthesis operation indicating the set of transform classes; and generating a transform output by providing a set of values of the intermediate data structure to a set of transform objects constructed from the set of transform classes.

2. The system of claim 1, wherein the set of transform objects comprises a combined transform object, and wherein providing the set of values of the intermediate data structure to the combined transform object comprises:

obtaining an intermediate output by executing a first transform object based on the set of values; and obtaining the transform output by executing a second transform object based on the intermediate output.

3. The system of claim 1, wherein:

the values of the source data framework comprise first values;

the feature conversion object is a first feature conversion object;

the intermediate data structure is a target intermediate data structure; and generating the target intermediate data structure comprises:

generating a previous intermediate data structure using a second feature conversion class by providing second values of the source data framework to a second feature conversion object constructed from the second feature conversion class; and generating the target intermediate data structure using the first feature conversion object by providing one or more values of the previous intermediate data structure to the first feature conversion object.

4. A method comprising:

obtaining a container image associated with a target framework, a built distribution comprising program code for a feature conversion class and a set of transform classes, and a set of configuration instructions;

executing executables in an execution order indicated by the set of configuration instructions in a container that is deployed based on the container image;

generating an intermediate data structure by providing values of a source data framework to a feature conversion object constructed from the feature conversion class;

obtaining an identifier of a feature synthesis operation indicating the set of transform classes; and in response to obtaining the identifier of the feature synthesis operation, generating a transform output by providing a set of values of the intermediate data structure to a set of transform objects constructed from the set of transform classes.

5. The method of claim 4, wherein:

the set of transform classes is a first set of transform classes;

the transform output is a first transform output;

the program code of the built distribution comprises program code for a second set of transform classes associated with an additional framework;

the feature synthesis operation is a first feature synthesis operation;

the set of transform objects is a first set of transform objects; and the method further comprising:

determining a first framework output of the target framework by providing, as an input, the first transform output to a first set of applications, wherein the first set of applications is native with respect to the target framework;

obtaining an identifier of a second feature synthesis operation indicating the second set of transform classes; and in response to obtaining the identifier of the second feature synthesis operation, generating a second transform output by providing the set of values to a second set of transform objects constructed from the second set of transform classes; and determining a second framework output of the additional framework by providing, as an input, the second transform output to a second set of applications, wherein the second set of applications is native with respect to the additional framework.

6. The method of claim 4, wherein the container is a first container, the method further comprising:

deploying the first container, wherein the first container comprises a first executable of the feature conversion class, and wherein generating the intermediate data structure comprises using the first container; and deploying a second container, wherein the second container comprises a second executable of the set of transform classes, and wherein generating the transform output comprises using the second container.

7. The method of claim 4, wherein the set of transform classes is a first set of transform classes, and wherein the container is a first container, the transform output is a first transform output, the method further comprising:

obtaining a second set of container images associated with a second target framework, a second built distribution comprising program code for a second set of transform classes;

deploying a second container based on the second set of container images;

generating, using the second container, second intermediate data by providing the values to a second feature conversion object;

generating a second transform output by providing the set of values of the intermediate data structure to a second set of transform objects constructed from the second set of transform classes; and determining an indication of a repeated transform operation based on the first transform output and the second transform output.

8. The method of claim 7, further comprising:

retrieving a first set of identifiers of the first set of transform classes; and determining a feature generation class based on the first set of transform classes.

9. The method of claim 4, further comprising:

determining whether features of the intermediate data structure is shared with a historic set of features;

identifying an additional feature associated with the historic set of features; and sending an identifier of the additional feature to a user associated with the container.

10. The method of claim 4, wherein the feature conversion class converts a text value into a numeric value.

11. The method of claim 4, wherein the feature conversion class converts a numeric value into a text value.

12. A set of non-transitory storage media storing program instructions that, when executed by a set of processors, causes the set of processors to perform operations comprising:
   obtaining a set of container images associated with a target framework, a built distribution comprising program code for a feature conversion class and a set of transform classes, and a set of configuration instructions;
   executing a set of executables of the built distribution in an execution order indicated by the set of configuration instructions in a container that is deployed based on the set of container images;
   generating a converted value based on a source value of a source data framework using the feature conversion class;
   obtaining an operation identifier; and
   in response to obtaining the operation identifier, generating an output based on the converted value using the set of transform classes.

13. The set of non-transitory storage media of claim 12, wherein the container is a first container, and wherein the output is a first output, the operations further comprising sending the converted value to a second container, wherein the second container uses the converted value to determine a second output that is different from the first output.

14. The set of non-transitory storage media of claim 12, wherein:
   the converted value is a first converted value;
   the source value is a first source value;
   the operations further comprise generating a second converted value based on a second source value of the source data framework; and
   generating the output comprises using the set of transform classes to generate the output based on the second converted value and the converted value.

15. The set of non-transitory storage media of claim 12, wherein the container is a first container, the operations further comprising:
   receiving, from a first user, a first command indicating the target framework, wherein obtaining the set of container images comprises obtaining the set of container images in response to receiving the first command;
   receiving, from a second user, a second command indicating the target framework;
   deploying a second container, wherein the second container and the first container do not share a pod; and
   sending, from the first container to the second container, the built distribution.

16. The set of non-transitory storage media of claim 12, the operations further comprising:

determining a geographical location associated with a message indicating the target framework;
selecting a set of computing resources based on the geographical location; and
deploying the container using the set of computing resources.

17. The set of non-transitory storage media of claim 12, wherein the container is a first container, the operations further comprising:
   deploying a plurality of containers, wherein the plurality of containers comprises the first container;
   obtaining identifiers of transform classes from the plurality of containers;
   obtaining a plurality of transform outputs from the plurality of containers; and
   selecting a feature value of the source data framework based on the plurality of transform outputs and the identifiers of the transform classes, wherein each value of the plurality of transform outputs satisfies a threshold based on the feature value; and
   sending the feature value to the plurality of containers.

18. The set of non-transitory storage media of claim 12, wherein the container is a first container, and wherein the converted value is a first converted value, the operations further comprising:
   deploying a plurality of containers, wherein the plurality of containers comprises the first container;
   obtaining a plurality of converted values, wherein the plurality of converted values comprises the first converted value;
   in response to a determination that the plurality of converted values share a same value, determining a feature conversion operator, wherein the feature conversion operator outputs the same value when provided with the source value; and
   updating a source database using the feature conversion operator.

19. The set of non-transitory storage media of claim 12, the operations further comprising:
   obtaining a plurality of initial data values;
   generating a plurality of feature values based on the plurality of initial data values by performing a set of intermediate transform operations; and
   storing the plurality of feature values in the source data framework, wherein the plurality of feature values comprises the source value.

20. The set of non-transitory storage media of claim 19, wherein the source value is associated with a set of data values of the plurality of initial data values, the operations further comprising:
   receiving, from the container, a message comprising an identifier of the set of data values; and
   sending the source value in response to receiving the message.

* * * * *